US00RE35075E

United States Patent [19]

Lammens, Jr.

[11] E Patent Number: Re. 35,075

[45] Reissued Date of Patent: Oct. 31, 1995

[54] [ELECTRICAL CONDULET EXTENSION BOX] *EXTENSION FOR ELECTRICAL JUNCTION BOX*

[75] Inventor: Albert Lammens, Jr., Covina, Calif.

[73] Assignee: Condulet Adapter, Inc., Del Mar, Calif.

[21] Appl. No.: 207,822

[22] Filed: Mar. 7, 1994

Related U.S. Patent Documents

Reissue of:

[64] Patent No.: 5,169,013
Issued: Dec. 8, 1992
Appl. No.: 736,001
Filed: Jul. 25, 1991

U.S. Applications:

[63] Continuation-in-part of Ser. No. 517,508, Apr. 26, 1990, abandoned, which is a continuation of Ser. No. 372,132, Jun. 27, 1989, abandoned, which is a continuation of Ser. No. 155,985, Feb. 16, 1988, abandoned.

[51] Int. Cl.[6] ..... H02G 3/08

[52] U.S. Cl. ..... 220/3.2; 174/65 R; 220/3.94; 220/4.26

[58] Field of Search ..... 220/3.2, 3.3, 3.5, 220/3.6, 3.7, 3.8, 3.92, 3.94, 4.26, 4.27; 174/50, 65 R

[56] References Cited

U.S. PATENT DOCUMENTS

| | | | |
|---|---|---|---|
| 537,182 | 4/1895 | Brown | 220/3.94 X |
| 2,401,598 | 6/1946 | Wood | 220/3.94 |
| 3,490,637 | 1/1970 | Pope | 220/3.94 X |
| 4,733,015 | 3/1988 | Barnes | 174/65 R |
| 4,794,207 | 12/1988 | Norberg et al. | 174/65 R X |
| 4,818,822 | 4/1989 | Yahraus | 174/65 R X |
| 4,823,952 | 4/1989 | Fletcher et al. | 220/4.26 X |
| 4,922,056 | 5/1990 | Larsson | 174/65 R |

FOREIGN PATENT DOCUMENTS

| | | | |
|---|---|---|---|
| 1063679 | 8/1959 | Germany | 220/3.94 |
| 22719 | of 1892 | United Kingdom | 220/3.2 |

*Primary Examiner*—Stephen F. Gerrity
*Attorney, Agent, or Firm*—Lyon & Lyon

[57] ABSTRACT

An extension box for electrical [condulets] *CONDULET boxes* or junction boxes can be used by itself as a basic junction box in an electrical conduit system or as an auxiliary junction box coupled to a basic junction box to increase the interior volume of or extend a branch conduit system from the basic junction box. The body of the extension box has coupling hubs leading through the body walls to the body interior, for receiving ends of electrical conduits. Complementary male and female coupling formations are provided at the open front and back of the extension box body to permit two or more extension boxes to be coupled in stacked relation to a conventional junction box such as a [condulet] *CONDULET*. Removable covers close the open back of the extension box.

12 Claims, 3 Drawing Sheets

FIG. 1.
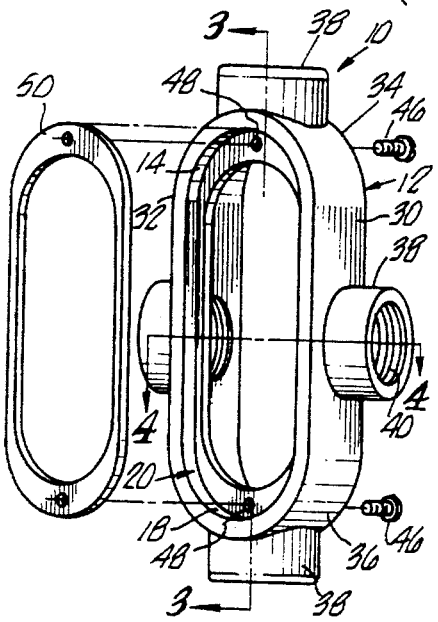
FIG. 2.
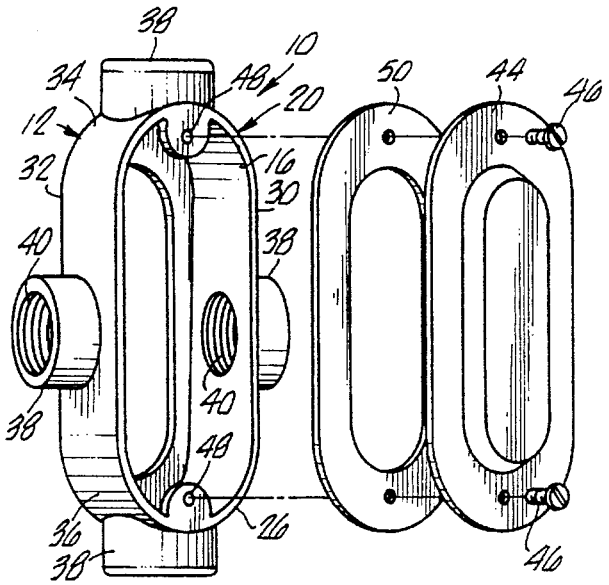
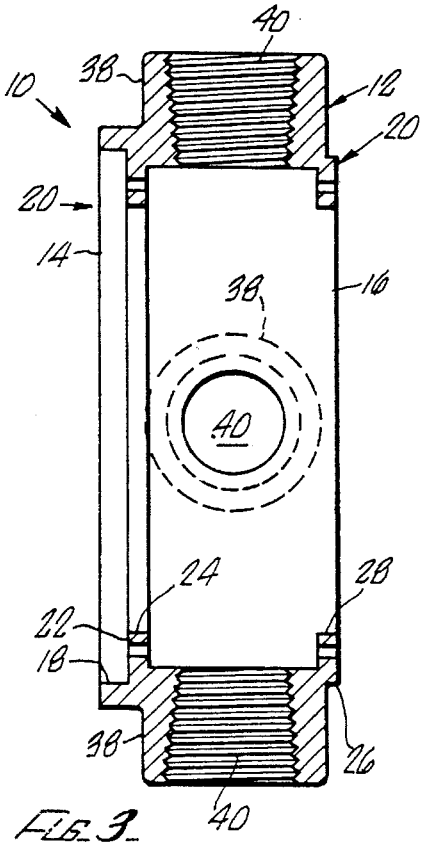
FIG. 3.
FIG. 4.
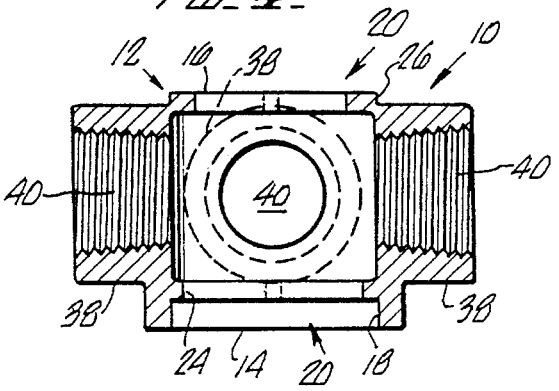
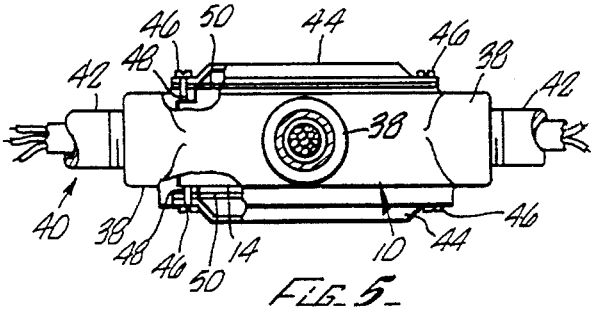
FIG. 5.

[ELECTRICAL CONDULET EXTENSION BOX] *EXTENSION FOR ELECTRICAL JUNCTION BOX*

Matter enclosed in heavy brackets [ ] appears in the original patent but forms no part of this reissue specification; matter printed in italics indicates the additions made by reissue.

BACKGROUND OF THE INVENTION

Continuing Application Information

This application is a Continuation-in-Part of U.S. Pat. Application Ser. No. 07/517,508, filed Apr. 26, 1990 and now abandoned, which in turn is a Continuation of U.S. Pat. Application Ser. No. 07/372,132, filed Jun. 27, 1989 and now abandoned, which in turn is a Continuation of U.S. Pat. Application Ser. No. 07/155,985, filed Feb. 16, 1988 and now abandoned.

FIELD OF THE INVENTION

The field of the invention is electrical junction boxes and [condulet] *CONDULET junction box* extensions. *CONDULET is a registered trademark of Cooper Industries, Houston, Texas.*

Building codes require most electrical wiring to be enclosed in electrical conduit which are coupled to one another by electrical junction boxes. A typical junction box has a hollow body with at least one open side, closed by a removable cover. The interior of the box and conduit coupling hubs extending through the walls of the box are accessible through the open side(s) of the box. Wires extend through the conduit into the junction boxes where they are commonly spliced or joined. Examples of prior electrical conduit systems and junction boxes are described in U.S. Pat. Nos. 1,741,358; 2,208,558; and 2,398,782.

One widely used junction box for such an electrical conduit system is [known as] a [condulet] *CONDULET box.* A [condulet] *CONDULET box* has a generally oblong body with one open longitudinal side and curved ends, and conduit coupling hubs at various locations on the body. [Condulets] g *CONDULET boxes* are assigned various type designations (e.g., C, LB, LR, LL, T and X) depending on the number and locations of these coupling hubs. [Condulet] *CONDULET box* specifications including dimensions, interior volume, maximum number of conductors, etc. are set forth in Article 370 of the National Electrical Code Hand Book, incorporated by reference herein.

[Condulets] *CONDULET boxes* have [condulet] bodies that form a separate portion of conduit or tubing system. The inside of a [condulet] *CONDULET box* body is accessed through a removable cover. Larger cast or sheet metal boxes are not classified as [condulets. Condulets ] *CONDULET boxes. CONDULET boxes* cannot be concealed or buried underground. Under industry code, they must be above ground or accessible underground, at all times. They can be installed indoors or outdoors and in damp locations, are dust proof and are coated inside and out to prevent corrosion.

[Condulet] *CONDULET box* bodies have threaded hubs and oblong bodies for ease of pulling wire. Oblong [condulet] *CONDULET box* bodies are designed for straight wire pulls, angled wire pulls and Y wire pulls. The oblong shape of a [condulet] *CONDULET box* body facilitates pulling wire through it without damaging the insulation on the wire, by avoiding pulls over sharp corners.

A common problem with [condulets] *CONDULET boxes* is that they often have insufficient interior junction box volume to satisfy code requirements. Electrical codes generally require a certain minimum interior junction box volume per wire connection in the box. Frequently the number of wire connections which must be made within a junction box is so large that the box volume per connection is less than that required by the code. In addition, with known junction boxes, extending or doubling up an electrical conduit system requires duplication of components and supports and makes interconnections difficult or cumbersome.

Accordingly, it is an object of the invention to provide [a condulet] *an* extension box which is attachable to a [condulet] *CONDULET box* to provide additional space for wiring connections.

It is a further object of the invention to provide such a [condulet] *CONDULET box* extension box which allows for the expansion or multiplication of an existing electrical conduit system without the need to cut into the conduit pipes.

It is a further object of the invention to provide such a [condulet] *CONDULET box* extension box which is stackable onto itself, as well as onto [condulets] *CONDULET boxes.*

It is a further object of the invention to provide a [condulet] *CONDULET box* extension box which has a rim for aligning a sealing gasket, aligning the extension box itself onto another box, and which carries any shear forces.

*Of course, the term CONDULET box as used herein is only exemplary of the general descriptive class of electrical junction boxes with which the present invention may be employed, and the present invention is not in any way limited to use with junction boxes on or in association with which the term CONDULET is used.*

SUMMARY OF THE INVENTION

The present invention provides a [condulet] *CONDULET box* extension box which can be used by itself as a basic junction box or [condulet] *CONDULET box* in an electrical conduit system, or as an extension box coupled to a basic junction box or [condulet] *CONDULET box* to increase the interior volume of and/or extend a branch conduit system from the basic junction box.

To these ends, an electrical [condulet] *CONDULET box* extension box includes a body having sides, ends, a front and a rear. A rim extends from the front of the [condulet] *CONDULET box* extension box body. A floor adjacent to the rim is connected to the body and extends generally perpendicular to the rim. The floor has an opening. Screws fasten a cover to the rear of the body. The screws and body are preferably made of metal or other electrically conductive material. Alternatively, a conducting element such as a wire or braid may extend across the extension box body, from front to back, and preferably from the floor to the screws at the back of the body. A boss or protrusion advantageously extends from the rear of the extension box body, to form a male coupling member, configured to engage and mate with the rim on the front of the extension box, which may be used as a female coupling member. A gasket is provided within the rim on the floor for sealing the box. One or more coupling hubs pass through the extension box body. The body advantageously has one or more conduit coupling hubs containing axial openings for receiving within each hub one end of an electrical conduit.

The complementary male and female coupling members or formations provided on opposite open faces of the extension box permit two or more of the present extension boxes to be coupled or stacked onto a conventional junction box, such as a [condulet] *CONDULET*. Removable covers close the open back (or front) of the present [condulet] *CONDULET box* extension box.

When used as a basic junction box in an electrical conduit system, the present [condulet] *CONDULET box* extension box may have one or more conduit coupling hubs arranged like the coupling hubs of any conventional [condulet] *CONDULET box*.

One or more of the present [condulet extension box] *CONDULET box extension boxes* may also be coupled to a basic conventional junction box, such as a [condulet] *CONDULET* to either increase the effective interior volume (to accommodate a large number of wire connections) or to extend a branch conduit system from the basic junction box. Preferably, the present [condulet] *CONDULET box* extension has an oblong shape similar to and is designed to be coupled to a conventional [condulet] *CONDULET box*.

The interiors of coupled junction boxes communicate through their adjacent open faces (front and back) whereby wires may extend from one box to another through these open faces. Each exposed open front and back, if any, is sealed by a removable cover.

BRIEF DESCRIPTION OF THE DRAWINGS

Other objects and features of the invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several views:

FIG. 1 is an exploded perspective front and side view of the present [condulet] *CONDULET box* extension box;

FIG. 2 is an exploded perspective front view of the [condulet] *CONDULET box* extension box of FIG. 1;

FIG. 3 is an enlarged section view taken along line 3—3 of FIG. 1;

FIG. 4 is an enlarged section view taken along line 4—4 of FIG. 1;

FIG. 5 is a side elevation view of the present box used by itself as a basic junction box in an electrical conduit system;

DESCRIPTION OF THE PREFERRED EMBODIMENT

Figure 6:
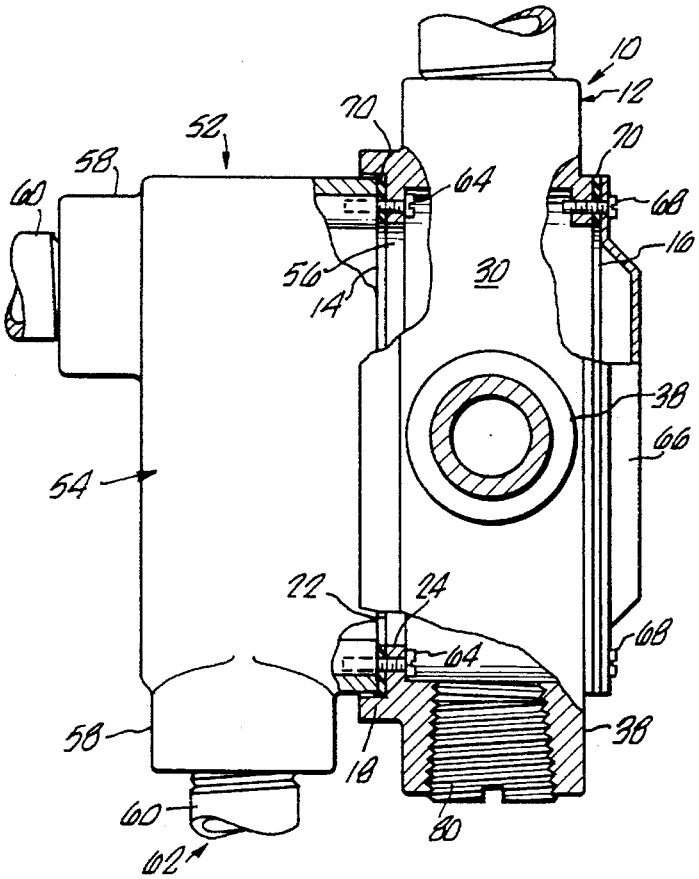
FIG. 6 is an enlarged side elevation view in part section of the present [condulet] *CONDULET box* extension box coupled to a conventional basic junction box (a [condulet] *CONDULET box*) to extend a branch conduit system from the basic box.
Figure 7:
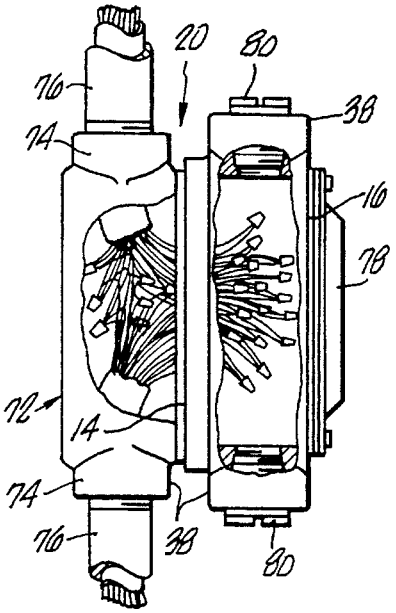
FIG. 7 is a side elevation in part section of the present condulet extension box coupled to a conventional basic junction box (a [condulet] *CONDULET box*) to increase the effective interior volume of the basic box to accommodate a large number of wire connections.
Figure 8:
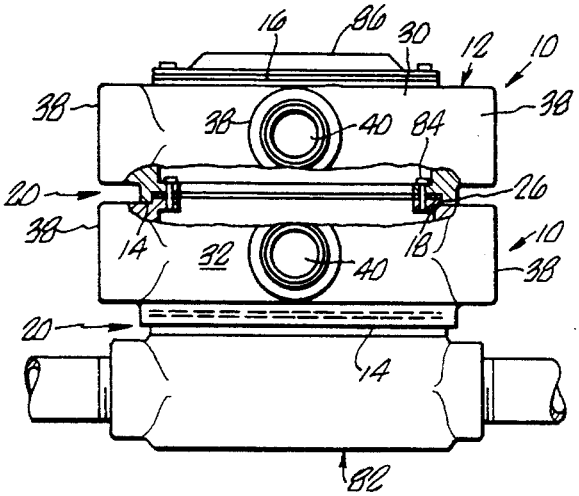
FIG. 8 is a side elevation view in part section of two of the present extension boxes coupled in stacked onto a conventional junction box, such as a [condulet] *CONDULET*.
Figure 10:
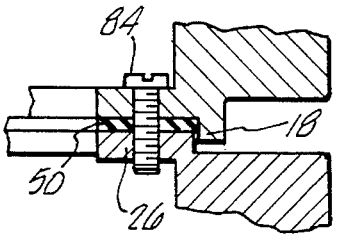
FIG. 10 is an enlarged section view fragment of the stack up of two extension boxes as shown in FIG. 8.

Turning now to the drawings, and first to FIGS. 1–4 an electrical [condulet] *CONDULET box* extension box 10 has a hollow body 12 with an open front 14, and an open back 16 through which the body interior is accessible. The open front of the body 12 has a rim 18 for receiving or mating with the open back 16 of a second electrical junction box so that the interiors of the two boxes communicate through their adjacent open areas. The second junction box may be a conventional electrical junction box, such as a [condulet] *CONDULET* as shown in FIGS. 6–8 or another of the present extension boxes as shown in FIGS. 7 and 8. The front 14 and back 16 of the extension box body 12 have complementary female and male coupling formations generally designated by 20.

The female coupling on the front of the extension box body 12 is formed by the rim 18 and a floor 22 within the rim. The male coupling is formed by a boss or projection 26 of the back of the body 12. Two or more extension boxes may be assembled front to back with one open back of each box facing an opposite open front of the adjacent box and with their adjacent coupling formations mutually interfit and aligned as shown in FIGS. 7 and 8. The rim 18 is sized and shaped to receive with a close fit the open side of a conventional junction box, such as a [condulet] *CONDULET* (FIGS. 6–8). The rim 18 and the floor 22 surround a front opening 24 in the body 12. The boss or male coupling 26 surrounds a back opening 28 at the back of the body 12.

Figure 9:
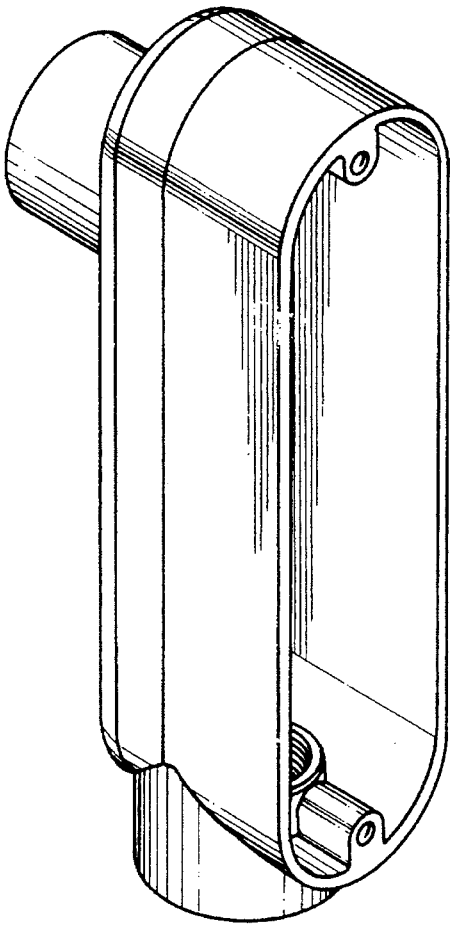
FIG. 9 is a perspective view of the L.B. [condulet] *CONDULET box* body shown in FIG. 6.

The body 12 of the extension box 10 has an oblong shape similar to the oblong shape of a conventional [condulet] *CONDULET box* such as the L.B. [condulet] *CONDULET* shown in FIG. 9. The longitudinal sides 30, 32 of the body 12 join with the opposite curved ends 34, 36. The body 12 preferably has four conduit coupling hubs 38 with intersecting axes. Each hub 38 contains an axial opening 40 to the body interior for receiving one end of an electrical conduit. The hub openings 40 are threaded for threaded connection to their conduits. Two of the coupling hubs 38 are located at the centers of the longitudinal body sides 30, 32 and on a common transverse axis of the body 12. The remaining two coupling hubs 38 are located at the body ends 34, 36 on a common longitudinal axis of the body. The extension box may of course have any number of coupling hubs arranged in any manner, such as the various [condulet] *CONDULET box* coupling hub arrangements. Alternatively, if it is intended solely for the purpose of increasing the interior wire connection volume of a basic junction box, the extension box 10 need not have [no] coupling hubs.

FIG. 5 illustrates the present extension box 10 used by itself as a basic junction box in an electrical conduit system 40. In this use, the extension box coupling hubs 38 are coupled to wire conduits 42 of the conduit system. The wires within the conduits enter and are joined within the extension box. The open front 14 and back 16 of the box are closed by covers 44 which are secured to the box by screws 46 threaded in holes 48 in the body. The covers are sealed to the body by gaskets 50. The gasket 50 is self-aligning within the rim 18 and on the screws 46 on the front of body 12. On the back of the body 12, the gasket 50 is aligned and secured by screws 46. The gasket 50 seals the extension box body 12 against dust, vapor and rain. However, the present [condulet] *CONDULET box* extension box 10 (as well as [condulets] *CONDULET boxes* in general) are for use only in accessible locations and not for underground or underwater applications.

FIG. 6 illustrates use of the extension box 10 as an auxiliary junction box which is secured to a basic junction box 52 of an electrical conduit system to extend a branch conduit system from the basic junction box. The basic junction box 52 shown is an "L.B." [condulet] *CONDULET box* and is shown separately in FIG. 9. However, it could also be another extension box 10 such as that illustrated in FIG. 5, or another style [condulet] *CONDULET box*. The "L.B." [condulet] *CONDULET box* has an oblong body 54 with an open back 56 and two right angle conduit coupling hubs 58 coupled to electrical conduits 60 of a basic conduit system 62. The extension box 10 is disposed alongside or piggybacked on the [condulet] *CONDULET box* 52 with the open back 56 of the [condulet] *CONDULET box* set within the rim 18 of the extension box. The rim 18 has an elongated shape complementing or matching the shape of the open side of the condulet body but slightly oversized. The rim 18, as shown in FIG. 6, is used to align and attach a first [condulet] *CONDULET box* extension box 10 to a [condulet] *CONDULET box* 52 or to a second [condulet] *CONDULET box* extension box. The rim 18 may be continuous or discontinuous in the form of segments. The extension box 10 is secured to the [condulet] *CONDULET box* 52 by screws 64. The opposite open side 16 of the extension junction box 10 is closed by a cover 66 which is secured by screws 68 to the body 12 and sealed to the body by a gasket 70. Screws 64 are accessed by first removing the cover 66.

FIG. 7 illustrates another use of the extension box 10 wherein it increases the interior volume of a basic junction box 72 to accommodate a large number of wire connections. As in FIG. 6, the basic junction box 72 illustrated however is a conventional [condulet] *CONDULET box* with coaxial end coupling hubs 74 coupled to wire conduits 76 of a basic conduit system. The extension box 10 in FIG. 7 is secured over the back side of the basic box 72 in the same manner as the extension box 10 in FIG. 7 are sealed by plugs 80, whereby the two boxes 10 and 72 effectively form a single larger box capable of accommodating a large number of wire connections, as shown, while complying with electrical code requirements which specify a minimum junction box volume per connection.

In FIG. 8, a plurality of extension boxes 10 are stacked onto the open back of a basic junction box 82 to function a auxiliary junction boxes for extending branch conduit systems from and/or increasing the effective interior wire connection volume of the basic box. The illustrated basic junction box 82 is a [condulet] *CONDULET box* like that in FIG. 7 although the basic box could be another extension box. The extension box 10 adjacent the basic box is secured to the latter box in the same manner as the extension boxes 10 in FIGS. 6 and 7. The adjacent extension boxes 10 are disposed with the open front 14 of one box and the opposite open back 16 of the adjacent box facing one another and with the male coupling formation 20 of the one box seating in the rim of female coupling formation 18 of the adjacent box, as shown. The adjacent extension boxes are joined by screws 84, and the open back of the outermost extension box 10 is closed by a cover 86.

As shown in FIGS. 6 and 8, the rim 18 provides 3 advantages:

1) It facilitates alignment and support of the extension box 10 onto the basic box 52 or 82. The electrician need only place the extension box 10 over the open back of the basic box 52 or 82. In marginally accessible locations or tight spaces, this can be done with one hand. The rim, as shown in FIG. 6, allows the extension box 10 to hang onto the basic box while the screws 64 or 84 are installed. The rim also causes the screw holes in the extension box to align with the screw holes in the basic box. Accordingly, the rim obviates the need for the electrician to manually support and align a [condulet] *CONDULET box* and its screw holes during installation.

2) The rim provides a structure for carrying shear forces between boxes. As shown in FIG. 6, the boxes are supported on conduit pipes. Tolerance build ups often cause a mismatch of alignment between the boxes. This makes it difficult to install the attachment screws 64 or 84. In the prior art, all shear force between the boxes is necessarily carried only by the 2 screws resulting in high shear stress on the screws and the possibility of excessive strain, failure, stress enhanced corrosion, etc. The rim 18, when secured over a basic box 54 or 82, centers the screw holes ideally with the screws placed only in tension when tightened. The rim surrounds the basic box on all sides so that any plane shear forces between the extension box 10 and basic box are carried by the rim and not the screws. Of course, part of the effectiveness of the rim's absorption of shear loads depends on the tolerances and fit between the tim and basic box.

3) The rim centers, supports and aligns the gasket 50. During installation, the gasket 50 need only be placed within the rim 18. The rim holds and aligns the gasket so that the clearance holes in the gasket align with the clearance holes in the [condulet] *CONDULET box* extension box 10. This also simplifies installation since the gasket need not be separately handled after it is placed within the rim.

[Condulets] *CONDULET boxes* are made of various types of conductive material to provide grounding and reduce the risk of electrical shock. The extension box 10 is also preferably made of an electrically conductive material. Alternatively, an electrically conducting element such as a metal braid, ribbon or wire can be provided within a non-electrically conducting extension box body 12 running from the front of the box (e.g., from the rim 14 or floor 22) to the back of the box (e.g., to the boss 20 at the back of the extension box), to provide electrical conductivity across a stack up of extension boxes.

As shown in FIG. 6, the metal screws 64 holding the extension box 10 to the [condulet] *CONDULET box* 52 not only rigidly attach the two boxes together, but they also ground the two boxes together by providing electrical conductivity or continuity between the extension box [1] *10* and the [condulet] *CONDULET* box 52. When a cover is attached to the extension box 10, as shown in FIG. 2, the cover is grounded to the body 12 through the electrical path provided by the screws 46 into the mounting holes 48 in the body. When the extension boxes 10 are stacked, e.g., as shown in FIG. 8, the screws 84 (together with the electrically conductive body or conducting element) provide a continuous electrically conductive path throughout the entire stack up. Since the metal screws pass through the gasket 50, the gasket does not interfere with electrical continuity.

The extension box 10, when attached to a [condulet] *CONDULET box* 52 in an existing conduit system 62 allows additional hubs to be added without cutting into the piping or conduit system 60 or installing additional junction boxes or [condulets] *CONDULET boxes*.

Figure 11:
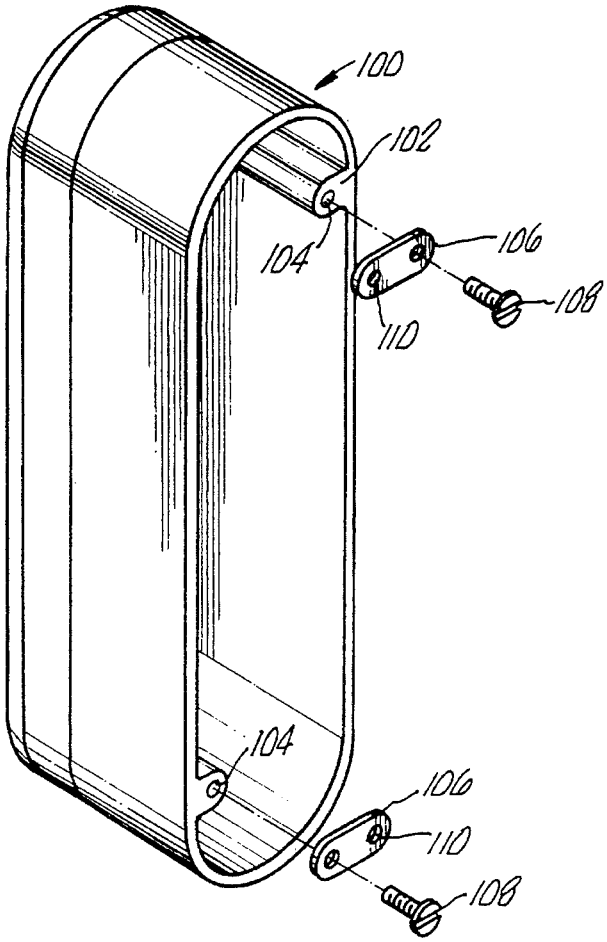
FIG. 11 is an alternate embodiment of the present extension box having swingable links for adapting to varying covers.

FIG. 11 shows an alternate embodiment of the extension box 100 having [boxes] *bosses* 102 extending from the sides of the box. The bosses 102 have threaded holes 104. Links 106 are secured to the bosses 102 by screws 108. The links 106 have threaded cover mounting holes 110 at one end. Some [condulets] *CONDULET boxes* have covers with varying hole patterns. The extension box 100 can use these covers by swinging the links to the position where the holes 110 align with the holes in the cover.

Many changes, modifications, variations and other uses and applications of the subject invention [with] *will* become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

What is claimed is:

1. An [electrical condulet] extension box *for an electrical junction box,* comprising:

a body having sides and ends and a front and a rear;

a shear force carrying rim extending from the front of an outer perimeter of said body, said rim having an inner wall defining a coupling opening;

a floor adjacent to and surrounded by said rim, connected to said body and extending generally perpendicular to said rim, said floor having front mounting holes and a central opening therethrough;

a boss extending from the rear of said body and having an outer wall dimensioned to be engageable with the coupling opening, said boss having rear mounting holes therethrough aligned with the front mounting holes;

a flat gasket supported on the floor and within the rim; and means for electrically connecting the front of the body to the rear of the body.

2. The extension box of claim 1 wherein said rim and body are substantially ovular.

3. The extension box of claim 1 further comprising at least one hub extending through the body.

4. The extension box of claim 1 wherein the means for electrically connecting comprises a conducting element extending from adjacent the floor to adjacent the back of the body.

5. The extension box of claim 1 wherein the means for electrically connecting comprises an electrically conducting material.

6. The extension box of claim 1 wherein the ends of the body are rounded.

*7. An extension box for an electrical junction box, comprising:*

*a body having sides and ends and a front and a rear;*

*a shear force carrying rim extending from the rim of an outer perimeter of said body, said rim having an inner wall defining a coupling opening;*

*a floor adjacent to and surrounded by said rim, connected to said body and extending generally perpendicular to said rim, said floor having front mounting holes and a central opening therethrough;*

*a boss extending from the rear of said body and having an outer wall dimensioned to be engageable with the coupling opening, said boss having rear mounting holes therethrough aligned with the front mounting holes; and*

*means for electrically connecting the front of the body to the rear of the body.*

*8. The extension box of claim 7 wherein said rim and body are substantially ovular.*

*9. The extension box of claim 7 further comprising at least one hub extending through the body.*

*10. The extension box of claim 7 wherein the means for electrically connecting comprises a conducting element extending from adjacent the floor to adjacent the back of the body.*

*11. The extension box of claim 7 wherein the means for electrically connecting comprises an electrically conducting material.*

*12. The extension box of claim 7 wherein the ends of the body are rounded.*

* * * * *